United States Patent
Aoun et al.

(10) Patent No.: US 12,550,930 B2
(45) Date of Patent: Feb. 17, 2026

(54) AEROSOL GENERATING ASSEMBLY COMPRISING A LAMINATED AEROSOL GENERATING MATERIAL

(71) Applicant: Nicoventures Trading Limited, London (GB)

(72) Inventors: Walid Abi Aoun, London (GB); Thomas David Leah, London (GB)

(73) Assignee: NICOVENTURES TRADING LIMITED, London (GB)

( * ) Notice: Subject to any disclaimer, the term of this patent is extended or adjusted under 35 U.S.C. 154(b) by 1027 days.

(21) Appl. No.: 17/264,232

(22) PCT Filed: Jul. 31, 2019

(86) PCT No.: PCT/EP2019/070723
§ 371 (c)(1),
(2) Date: Jan. 28, 2021

(87) PCT Pub. No.: WO2020/025725
PCT Pub. Date: Feb. 6, 2020

(65) Prior Publication Data
US 2021/0298350 A1    Sep. 30, 2021

(30) Foreign Application Priority Data
Jul. 31, 2018 (GB) ..................... 1812508

(51) Int. Cl.
*A24F 47/00* (2020.01)
*A24B 3/14* (2006.01)
(Continued)

(52) U.S. Cl.
CPC .................. *A24D 1/20* (2020.01); *A24B 3/14* (2013.01); *A24B 15/12* (2013.01); *A24B 15/167* (2016.11);
(Continued)

(58) Field of Classification Search
CPC .. A24D 1/20; A24B 3/14; A24B 15/12; A24B 15/167; A24B 15/14; A24B 3/12;
(Continued)

(56) References Cited

U.S. PATENT DOCUMENTS 3,259,136 A    7/1966 Roth et al.
3,872,871 A    3/1975 Strickland et al.
(Continued)

FOREIGN PATENT DOCUMENTS

CA    3034967 A1    5/2018
CN    103929988 A    7/2014
(Continued)

OTHER PUBLICATIONS

EurekAlert!, Hybrid Device Delivers Tobacco Flavors with e-cig like Vapor, Retrieved from <https://www.eurekalert.org/news-releases/749693>, R&D at British American Tobacco, Mar. 5, 2016, 2 pages.
(Continued)

*Primary Examiner* — Abdullah A Riyami
*Assistant Examiner* — Nelson R. Burgos-Guntin
(74) *Attorney, Agent, or Firm* — WOMBLE BOND DICKINSON (US) LLP

(57) ABSTRACT

Disclosed herein is a laminate aerosol generating material, wherein the material comprises an aerosol-forming amorphous solid layer (4) attached to a carrier layer (2), wherein the carrier (2) is attached to a first surface of the amorphous solid (4), and wherein the carrier will not adhere to any other surface of the amorphous solid.

15 Claims, 6 Drawing Sheets

(51) Int. Cl.
*A24B 15/12* (2006.01)
*A24B 15/167* (2020.01)
*A24C 5/01* (2020.01)
*A24D 1/20* (2020.01)
*A24F 40/20* (2020.01)
*A24F 40/10* (2020.01)
*A24F 40/30* (2020.01)
*A24F 40/46* (2020.01)

(52) U.S. Cl.
CPC ............... *A24C 5/01* (2020.01); *A24F 40/20* (2020.01); *A24F 40/10* (2020.01); *A24F 40/30* (2020.01); *A24F 40/46* (2020.01)

(58) Field of Classification Search
CPC . A24C 5/01; A24F 40/20; A24F 40/10; A24F 40/30; A24F 40/46
See application file for complete search history.

(56) References Cited

U.S. PATENT DOCUMENTS

| | | | |
|---|---|---|---|
| 3,986,515 A | 10/1976 | Onishi et al. | |
| 5,101,839 A | 4/1992 | Tsuruizumi et al. | |
| 5,148,821 A | 9/1992 | Saito et al. | |
| 5,339,838 A | 8/1994 | Carroll et al. | |
| 5,665,262 A * | 9/1997 | Hajaligol | A24F 40/46 131/194 |
| 5,692,526 A * | 12/1997 | Adams | A24C 5/01 131/365 |
| 5,778,899 A | 7/1998 | Mishra et al. | |
| 5,799,663 A | 9/1998 | Zuber et al. | |
| 6,095,152 A | 8/2000 | Greim et al. | |
| 6,216,706 B1 | 4/2001 | Greim et al. | |
| 7,582,343 B1 | 9/2009 | Johnson | |
| 2002/0129826 A1* | 9/2002 | Nakanishi | A24B 15/14 131/370 |
| 2006/0130857 A1 | 6/2006 | Terry et al. | |
| 2006/0191548 A1 | 8/2006 | Nishimura et al. | |
| 2010/0247612 A1* | 9/2010 | Fuisz | A61P 17/02 424/443 |
| 2010/0258139 A1 | 10/2010 | Chen et al. | |
| 2011/0030707 A1 | 2/2011 | Tanaka | |
| 2011/0036367 A1 | 2/2011 | Zuber et al. | |
| 2011/0083677 A1 | 4/2011 | Plojoux et al. | |
| 2011/0100382 A1 | 5/2011 | Li et al. | |
| 2011/0126848 A1 | 6/2011 | Metrangolo et al. | |
| 2011/0147486 A1 | 6/2011 | Rasouli et al. | |
| 2011/0155718 A1 | 6/2011 | White | |
| 2011/0277756 A1 | 11/2011 | Hufnagel et al. | |
| 2012/0080042 A1 | 4/2012 | Blandino et al. | |
| 2012/0153772 A1* | 6/2012 | Landa | B28B 11/24 428/221 |
| 2013/0125904 A1 | 5/2013 | Batista | |
| 2013/0319430 A1 | 12/2013 | Batista | |
| 2014/0305448 A1 | 10/2014 | Mishra et al. | |
| 2014/0305449 A1 | 10/2014 | Batista et al. | |
| 2015/0020832 A1* | 1/2015 | Greim | A24F 40/65 131/329 |
| 2015/0027454 A1* | 1/2015 | Li | A24D 3/048 131/328 |
| 2015/0107610 A1* | 4/2015 | Metrangolo | A24D 1/20 131/335 |
| 2015/0114405 A1* | 4/2015 | Rasouli | A24B 15/285 131/331 |
| 2015/0209530 A1 | 7/2015 | Ragnar | |
| 2016/0271347 A1* | 9/2016 | Raichman | A24F 40/05 |
| 2016/0286851 A1 | 10/2016 | Fiore et al. | |
| 2016/0295917 A1* | 10/2016 | Malgat | A24F 40/46 |
| 2016/0295922 A1* | 10/2016 | John | A24F 40/46 |
| 2017/0055576 A1* | 3/2017 | Beeson | A24D 1/02 |
| 2017/0119049 A1 | 5/2017 | Egri | |
| 2017/0143041 A1* | 5/2017 | Batista | A24F 1/00 |
| 2017/0143042 A1* | 5/2017 | Batista | A24F 40/46 |
| 2017/0150755 A1 | 6/2017 | Jakob et al. | |
| 2017/0164657 A1* | 6/2017 | Batista | A24F 40/42 |
| 2017/0231266 A1 | 8/2017 | Young et al. | |
| 2017/0340003 A1* | 11/2017 | Batista | A24F 40/46 |
| 2018/0014568 A1 | 1/2018 | Gross et al. | |
| 2018/0177228 A1 | 6/2018 | Beven et al. | |
| 2018/0192687 A1 | 7/2018 | Kumar et al. | |
| 2020/0253268 A1* | 8/2020 | Rousseau | A24D 1/022 |
| 2021/0244087 A1* | 8/2021 | Falk | A24D 1/20 |
| 2021/0298350 A1* | 9/2021 | Aoun | A24B 15/14 |
| 2023/0087967 A1* | 3/2023 | Abi Aoun | A24D 3/061 |
| 2023/0128342 A1* | 4/2023 | Neagu | B65D 75/30 396/461 |
| 2024/0000138 A1* | 1/2024 | Hepworth | A24C 5/01 |
| 2024/0023598 A1* | 1/2024 | Batista | A24F 40/20 |

FOREIGN PATENT DOCUMENTS

| | | | |
|---|---|---|---|
| CN | 104824830 A | 8/2015 | |
| CN | 105899095 A | 8/2016 | |
| CN | 106455704 A | 2/2017 | |
| CN | 106535668 A | 3/2017 | |
| CN | 106659247 A | 5/2017 | |
| CN | 107912801 A | 4/2018 | |
| CN | 108135275 A | 6/2018 | |
| EP | 3281535 A1 | 2/2018 | |
| FR | 2344236 A1 | 10/1977 | |
| GB | 2570162 A | 7/2019 | |
| JP | S4739356 Y1 | 11/1972 | |
| JP | 2003-501567 A | 1/2003 | |
| JP | 2007-246664 A2 | 9/2007 | |
| JP | 2007-267749 A2 | 10/2007 | |
| JP | 2011504733 A | 2/2011 | |
| JP | 2013532985 A | 8/2013 | |
| JP | 2015517818 A | 6/2015 | |
| JP | 2018515119 A | 6/2018 | |
| KR | 20160071458 A | 6/2016 | |
| KR | 20160131035 A | 11/2016 | |
| RU | 2604313 C2 | 12/2016 | |
| RU | 2638514 C2 | 12/2017 | |
| RU | 2639117 C1 | 12/2017 | |
| WO | 98/25438 | 6/1998 | |
| WO | 2013022936 A1 | 2/2013 | |
| WO | 2013178766 A1 | 12/2013 | |
| WO | 2015062983 A2 | 5/2015 | |
| WO | 2015071682 A1 | 5/2015 | |
| WO | 2016050706 A1 | 4/2016 | |
| WO | 2016083474 A1 | 6/2016 | |
| WO | 2016135331 A1 | 9/2016 | |
| WO | 2016156424 A1 | 10/2016 | |
| WO | 2016156495 A2 | 10/2016 | |
| WO | 2016184977 A1 | 11/2016 | |
| WO | 2017005705 A1 | 1/2017 | |
| WO | 2017041920 A1 | 3/2017 | |
| WO | 2017042297 A1 | 3/2017 | |
| WO | 2017042298 A1 | 3/2017 | |
| WO | 2017068093 A1 | 4/2017 | |
| WO | 2017097840 A1 | 6/2017 | |
| WO | 2017178394 A1 | 10/2017 | |
| WO | 2018122375 A1 | 7/2018 | |
| WO | 2018178290 A2 | 10/2018 | |

OTHER PUBLICATIONS

Examination Report 2 received for New Zealand Application No. 771789, mailed on Apr. 6, 2023, 5 pages.
Examination Report received for New Zealand Application No. 771789, mailed on Oct. 4, 2022, 5 Pages.
First Office Action and Search Report received for Chinese Patent Application No. 201980050581.0, mailed on Feb. 15, 2022, 16 pages (8 pages of English Translation and 8 pages of Official Copy).
First Office Action and Search Report received for Chinese Patent Application No. 201980051031.0, mailed on Jan. 13, 2022, 15 pages (7 pages of English Translation and 8 pages of Official Copy).
Ghanouni, Kav, et al., Application and File History for U.S. Appl. No. 17/250,498, filed Jan. 28, 2021.
Ghanouni, Kav, et al., Application and File History for U.S. Appl. No. 17/250,500, filed Jan. 28, 2021.

(56) References Cited

OTHER PUBLICATIONS

International Preliminary Report on Patentability received for PCT Patent Application No. PCT/EP2019/070675, mailed on Feb. 11, 2021, 7 Pages.
International Preliminary Report on Patentability received for PCT Patent Application No. PCT/EP2019/070706, mailed on Feb. 11, 2021, 8 Pages.
International Preliminary Report on Patentability received for PCT Patent Application No. PCT/EP2019/070717, mailed on Feb. 11, 2021, 6 Pages.
International Preliminary Report on Patentability received for PCT Patent Application No. PCT/EP2019/070723, mailed on Feb. 11, 2021, 6 Pages.
International Preliminary Report on Patentability received for PCT Patent Application No. PCT/EP2019/070729, mailed on Feb. 11, 2021, 7 Pages.
International Search Report and Written Opinion for Application No. PCT/EP2019/070706, mailed on Nov. 29, 2019, 13 Pages.
International Search Report and Written Opinion for Application No. PCT/EP2019/070717, mailed on Dec. 11, 2019, 8 Pages.
International Search Report and Written Opinion for Application No. PCT/EP2019/070723, mailed on Nov. 27, 2019, 8 Pages.
International Search Report and Written Opinion for Application No. PCT/EP2019/070729, mailed on Nov. 27, 2019, 9 Pages.
International Search Report and Written Opinion received for PCT Patent Application No. PCT/EP2019/070675, mailed on Nov. 27, 2019, 12 Pages.
Karl Kaljura, et al., Application and File History for U.S. Appl. No. 17/264,240, filed Jan. 28, 2021.
Notice to File a Response received for KR Application No. 10-2021-7005672 mailed on Mar. 15, 2023, 13 pages. (7 pages of English translation and 6 pages of Official copy).
Office action and Search report received for Chinese Patent Application No. 201980050491.1, mailed on Feb. 7, 2022, 12 pages (6 pages of English Translation and 6 pages of Official Copy).
Office Action and Search Report received for Russian Patent Application No. 2021104583, mailed on Nov. 10, 2022, 16 Pages.
Office Action received for Canadian Patent Application No. 3107191, mailed on Jan. 9, 2023, 4 Pages.
Office Action received for Chinese Patent Application No. 201980051031.0, mailed on Jun. 30, 2022, 15 pages (8 pages of English Translation and 7 pages of Official Copy).
Office Action received for Russian Patent Application No. 2021104385, mailed on Nov. 14, 2022, 11 Pages.
Patrick Moloney, et al., Application and File History for U.S. Appl. No. 17/264,264, filed Jan. 28, 2021.
Search Report received for Russian Patent Application No. 2021104385, mailed on Nov. 11, 2022, 2 Pages.
Walid Abi Aoun, et al., Application and File History for U.S. Appl. No. 17/264,232, filed Jan. 28, 2020.

* cited by examiner

AEROSOL GENERATING ASSEMBLY COMPRISING A LAMINATED AEROSOL GENERATING MATERIAL

PRIORITY CLAIM

The present application is a National Phase entry of PCT Application No. PCT/EP2019/070723, filed Jul. 31, 2019, which claims priority from Great Britain Application No. 1812508.8, filed Jul. 31, 2018, each of which is hereby fully incorporated herein by reference.

TECHNICAL FIELD

The present disclosure relates to aerosol generation.

BACKGROUND

Smoking articles such as cigarettes, cigars and the like burn tobacco during use to create tobacco smoke. Alternatives to these types of articles release an inhalable aerosol or vapour by releasing compounds from a substrate material by heating without burning. These may be referred to as non-combustible smoking articles or aerosol generating assemblies.

One example of such a product is a heating device which release compounds by heating, but not burning, a solid aerosolizable material. This solid aerosolizable material may, in some cases, contain a tobacco material. The heating volatilises at least one component of the material, typically forming an inhalable aerosol. These products may be referred to as heat-not-burn devices, tobacco heating devices or tobacco heating products. Various different arrangements for volatilising at least one component of the solid aerosolizable material are known.

As another example, there are e-cigarette/tobacco heating product hybrid devices, also known as electronic tobacco hybrid devices. These hybrid devices contain a liquid source (which may or may not contain nicotine) which is vaporized by heating to produce an inhalable vapor or aerosol. The device additionally contains a solid aerosolizable material (which may or may not contain a tobacco material) and components of this material are entrained in the inhalable vapor or aerosol to produce the inhaled medium.

SUMMARY

A first aspect of the disclosure provides a laminate aerosol generating material, wherein the material comprises an aerosol-forming amorphous solid layer attached to a carrier layer, wherein the carrier may be attached to a first surface of the amorphous solid, and wherein the carrier will not adhere to any other surface of the amorphous solid.

A second aspect of the disclosure provides an aerosol generating assembly comprising a laminate aerosol generating material according to the first aspect of the disclosure and a heater configured to heat but not burn the laminate aerosol generating material.

A third aspect of the disclosure provides an aerosol-generating article for use in an aerosol generating assembly, the article comprising a laminate aerosol generating material according to the first aspect.

A fourth aspect of the disclosure provides a method of making laminate aerosol generating material according to the first aspect. The method may comprise (a) forming a slurry comprising components of the amorphous solid or precursors thereof, (b) applying the slurry to the carrier, (c) setting the slurry to form a gel, and (d) drying to form an amorphous solid.

Further aspects of the disclosure described herein may provide the use of the laminate aerosol generating material, the aerosol generating article or the aerosol generating assembly, in the generation of an inhalable aerosol.

Further features and advantages of the disclosure will become apparent from the following description, given by way of example only, and with reference to the accompanying figures.

DETAILED DESCRIPTION

The aerosol-forming layer described herein comprises an "amorphous solid", which may alternatively be referred to as a "monolithic solid" (e.g., non-fibrous), or as a "dried gel". The amorphous solid is a solid material that may retain some fluid, such as liquid, within it. In some cases, the aerosol-forming layer comprises from 50 wt %, 60 wt % or 70 wt % of amorphous solid, to about 90 wt %, 95 wt % or 100 wt % of amorphous solid. In some cases, the aerosol-forming layer consists of amorphous solid.

Figure 1:
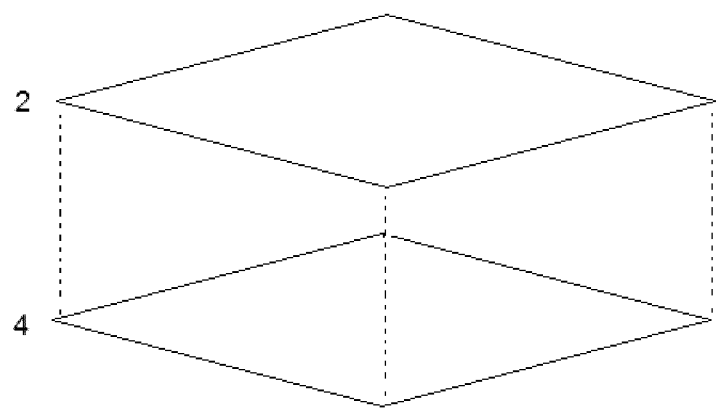
FIG. 1 is an exploded schematic diagram of a laminate aerosol generating material.

As described above, the disclosure provides a laminate aerosol generating material, wherein the material comprises an aerosol-forming amorphous solid layer attached to a carrier layer, wherein the carrier may be attached to a first surface of the amorphous solid, and wherein the carrier will not adhere to any other surface of the amorphous solid. FIG. 1 provides a schematic illustration of such a laminate material; the laminate structure (indicated by dotted lines) includes a carrier layer 4, and an amorphous solid layer 2.

In some cases, one or more surface of the laminate aerosol generating material may be treated with an anti-adhesive agent. The anti-adhesive agent may be applied to the carrier or to the amorphous solid components of the laminate material.

For example, the anti-adhesive agent may comprise celluloses, starches, lecithin, silicone or polytetrafluoroethylene (PTFE) and the like. The anti-adhesive agent is stable (e.g., does not melt, decompose etc.) at the operating temperatures of the assemblies described herein. In a further alternative, the anti-adhesive agent may be talcum powder (or another powder) that may be applied to the surface of the amorphous solid, and which may cover the tackiness and prevent adhesion.

In some cases, the material may be a sheet, optionally in wound or coiled form. The amorphous solids described herein are formed by drying a gel and have tacky surfaces which complicates the handling. Through selecting a carrier that will substantially not adhere to the tacky amorphous solid, the laminate can be wound onto a bobbin, thereby improving the handleability.

A bobbin with a sheet according to the first aspect of the disclosure wound onto it, may form an additional aspect of the disclosure.

In some cases, the laminate aerosol generating material may comprise one or more magnets which can be used to fasten the material to an induction heater in use.

In some cases, the laminate aerosol generating material may comprise embedded heating means, such as resistive or inductive heating elements. For example, the heating means may be embedded in the amorphous solid.

In some cases, the material may be provided as a shredded sheet. The amorphous solid can then be used in place of cut-rag tobacco. In such circumstances, the carrier needs to not adhere to the tacky amorphous solid to prevent the shredded sheet from sticking together and forming solid lumps. It may be beneficial to prevent clumping in this way; generation of aerosol from a mass of shredded amorphous solid that has stuck together will be slower than if the amorphous solid pieces are separate.

In some cases, the laminate aerosol generating material may have a mass per unit area of 30-120 $g/m^2$. Such area densities may be particularly suitable where the aerosol-generating material is included in an aerosol generating article/assembly in sheet form, or as a shredded sheet (described further hereinbelow). In some embodiments, aerosol generating material may have an area density of from about 30 to 70 $g/m^2$, or about 40 to 60 $g/m^2$. In some embodiments, the amorphous solid may have an area density of from about 80 to 120 $g/m^2$, or from about 70 to 110 $g/m^2$, or particularly from about 90 to 110 $g/m^2$, suitably about 100 $g/m^2$ (so that it has a similar density to cut rag tobacco and a mixture of these two substances will not readily separate).

In some examples, the amorphous solid in sheet form may have a tensile strength of from around 200 N/m to around 900 N/m. In some examples, such as where the amorphous solid does not comprise a filler, the amorphous solid may have a tensile strength of from 200 N/m to 400 N/m, or 200 N/m to 300 N/m, or about 250 N/m. Such tensile strengths may be particularly suitable for embodiments wherein the aerosol generating material may be formed as a sheet and then shredded and incorporated into an aerosol generating article. In some examples, such as where the amorphous solid comprises a filler, the amorphous solid may have a tensile strength of from 600 N/m to 900 N/m, or from 700 N/m to 900 N/m, or around 800 N/m. Such tensile strengths may be particularly suitable for embodiments wherein the aerosol generating material is included in an aerosol generating article/assembly as a rolled sheet, suitably in the form of a tube.

In some cases, the carrier layer may be substantially or wholly impermeable to gas or aerosol. This prevents aerosol or gas passage through the carrier, thereby controlling the flow and ensuring good delivery to the user. This can also be used to prevent condensation or other deposition in use of the gas/aerosol on, for example, the surface of a heater provided in an aerosol generating assembly. Thus, consumption efficiency and hygiene can be improved in some cases.

The carrier may be any suitable material which can be used to support an amorphous solid. In some cases, the carrier may be formed from materials selected from metal foil, paper, carbon paper, greaseproof paper, ceramic, carbon allotropes such as graphite and graphene, plastic, cardboard, wood or combinations thereof. In some cases, the carrier may comprise or consist of a tobacco material, such as a sheet of reconstituted tobacco. In some cases, the carrier may be formed from materials selected from metal foil, paper, cardboard, wood or combinations thereof. In some cases, the carrier itself be a laminate structure comprising layers of materials selected from the preceding lists. In some cases, the carrier may also function as a flavor carrier. For example, the carrier may be impregnated with a flavorant or with tobacco extract.

In one case, the surface of the carrier that abuts the amorphous solid may be porous. For example, in some cases, the carrier comprises paper. The inventors have found that a porous carrier such as paper may be particularly suitable for the present disclosure; the porous (paper) layer abuts the amorphous solid layer and forms a strong bond. The amorphous solid may be formed by drying a gel and, without being limited by theory, it is thought that the slurry from which the gel may be formed partially impregnates the porous carrier (e.g. paper) so that when the gel sets and forms cross-links, the carrier may be partially bound into the gel. This provides a strong binding between the gel and the carrier (and between the dried gel and the carrier).

Additionally, surface roughness may contribute to the strength of bond between the amorphous material and the carrier. The inventors have found that the paper roughness (for the surface abutting the carrier) may suitably be in the range of 50-1000 Bekk seconds, suitably 50-150 Bekk seconds, suitably 100 Bekk seconds (measured over an air pressure interval of 50.66-48.00 kPa). (A Bekk smoothness tester is an instrument used to determine the smoothness of a paper surface, in which air at a specified pressure is leaked between a smooth glass surface and a paper sample, and the time (in seconds) for a fixed volume of air to seep between these surfaces is the "Bekk smoothness".)

Conversely, the surface of the carrier facing away from the amorphous solid may be arranged in contact with the heater, and a smoother surface may provide more efficient heat transfer. Thus, in some cases, the carrier is disposed so as to have a rougher side abutting the amorphous material and a smoother side facing away from the amorphous material.

In one particular case, the carrier may be a paper-backed foil; the paper layer abuts the amorphous solid layer and the properties discussed in the previous paragraphs are afforded by this abutment. The foil backing is substantially impermeable, providing control of the aerosol flow path. A metal foil backing may also serve to conduct heat to the amorphous solid.

In another case, the foil layer of the paper-backed foil abuts the amorphous solid. The foil is substantially impermeable, thereby preventing water provided in the amorphous solid to be absorbed into the paper which could weaken its structural integrity.

In some cases, the carrier may be formed from or comprises metal foil, such as aluminium foil. A metallic carrier may allow for better conduction of thermal energy to the amorphous solid. Additionally, or alternatively, a metal foil may function as a susceptor in an induction heating system. In particular embodiments, the carrier comprises a metal foil layer and a support layer, such as cardboard. In these embodiments, the metal foil layer may have a thickness of less than 20 μm, such as from about 1 μm to about 10 μm, suitably about 5 μm.

In another case, a paper and greaseproof paper laminate has also been found to be particularly useful for the present disclosure. The paper layer abuts the amorphous solid and the tacky amorphous solid does not stick readily to the greaseproof paper carrier backing.

In some cases, one or more of the surfaces of the carrier, other than the surface other than the layer attached to the first surface of the amorphous solid, may be treated to prevent adhesion of the tacky amorphous solid once the amorphous solid has set and dried. For example, the surfaces may be treated with PTFE (polytetrafluoroethylene) or other non-stick materials.

In some cases, the amorphous solid may have a thickness of about 0.015 mm to about 1.0 mm. Suitably, the thickness may be in the range of about 0.05 mm, 0.1 mm or 0.15 mm to about 0.5 mm or 0.3 mm. The inventors have found that a material having a thickness of 0.2 mm is particularly suitable. The amorphous solid may comprise more than one layer, and the thickness described herein refers to the aggregate thickness of those layers.

The inventors have established that if the aerosol-forming amorphous solid is too thick, then heating efficiency is compromised. This adversely affects the power consumption in use. Conversely, if the aerosol-forming amorphous solid is too thin, it is difficult to manufacture and handle; a very thin material is harder to cast and may be fragile, compromising aerosol formation in use.

The inventors have established that the amorphous solid thicknesses stipulated herein optimise the material properties in view of these competing considerations.

The thickness stipulated herein is a mean thickness for the material. In some cases, the amorphous solid thickness may vary by no more than 25%, 20%, 15%, 10%, 5% or 1%.

Aerosol-Forming Material Composition

In some cases, the amorphous solid may comprise 1-60 wt % of a gelling agent wherein these weights are calculated on a dry weight basis.

Suitably, the amorphous solid may comprise from about 1 wt %, 5 wt %, 10 wt %, 15 wt %, 20 wt % or 25 wt % to about 60 wt %, 50 wt %, 45 wt %, 40 wt %, 35 wt %, 30 wt % or 27 wt % of a gelling agent (all calculated on a dry weight basis). For example, the amorphous solid may comprise 1-50 wt %, 5-40 wt %, 10-30 wt % or 15-27 wt % of a gelling agent.

In some embodiments, the gelling agent comprises a hydrocolloid. In some embodiments, the gelling agent comprises one or more compounds selected from the group comprising alginates, pectins, starches (and derivatives), celluloses (and derivatives), gums, silica or silicones compounds, clays, polyvinyl alcohol and combinations thereof. For example, in some embodiments, the gelling agent comprises one or more of alginates, pectins, hydroxyethyl cellulose, hydroxypropyl cellulose, carboxymethylcellulose, pullulan, xanthan gum guar gum, carrageenan, agarose, acacia gum, fumed silica, PDMS, sodium silicate, kaolin and polyvinyl alcohol. In some cases, the gelling agent comprises alginate or pectin, and may be combined with a setting agent (such as a calcium source) during formation of the amorphous solid. In some cases, the amorphous solid may comprise a calcium-crosslinked alginate or a calcium-crosslinked pectin.

In some embodiments, the gelling agent comprises alginate, and the alginate is present in the amorphous solid in an amount of from 10-30 wt % of the amorphous solid (calculated on a dry weight basis). In some embodiments, alginate is the only gelling agent present in the amorphous solid. In other embodiments, the gelling agent comprises alginate and at least one further gelling agent, such as pectin.

In some embodiments the amorphous solid may include gelling agent comprising carrageenan.

Suitably, the amorphous solid may comprise from about 5 wt %, 10 wt %, 15 wt %, or 20 wt % to about 80 wt %, 70 wt %, 60 wt %, 55 wt %, 50 wt %, 45 wt % 40 wt %, or 35 wt % of an aerosol generating agent (all calculated on a dry weight basis). The aerosol generating agent may act as a plasticiser. For example, the amorphous solid may comprise 5-60 wt %, 10-50 wt % or 20-40 wt % of an aerosol generating agent. In some cases, the aerosol generating agent comprises one or more compound selected from erythritol, propylene glycol, glycerol, triacetin, sorbitol and xylitol. In some cases, the aerosol generating agent comprises, consists essentially of or consists of glycerol. The inventors have established that if the content of the plasticiser is too high, the amorphous solid may absorb water resulting in a material that does not create an appropriate consumption experience in use. The inventors have established that if the plasticiser content is too low, the amorphous solid may be brittle and easily broken. The plasticiser content specified herein provides an amorphous solid flexibility which allows the amorphous solid sheet to be wound onto a bobbin, which is useful in manufacture of aerosol generating articles.

In some cases, the amorphous solid additionally comprises an active substance. For example, in some cases, the amorphous solid additionally comprises a tobacco material or nicotine. For example, the amorphous solid may additionally comprise powdered tobacco or nicotine or a tobacco extract. In some cases, the amorphous solid may comprise from about 1 wt %, 5 wt %, 10 wt %, 15 wt %, 20 wt % or 25 wt % to about 70 wt %, 50 wt %, 45 wt % or 40 wt % (calculated on a dry weight basis) of active substance. In some cases, the amorphous solid may comprise from about 1 wt %, 5 wt %, 10 wt %, 15 wt %, 20 wt % or 25 wt % to about 70 wt %, 60 wt %, 50 wt %, 45 wt % or 40 wt % (calculated on a dry weight basis) of a tobacco material or nicotine.

In some cases, the amorphous solid comprises an active substance such as tobacco extract. In some cases, the amorphous solid may comprise 5-60 wt % (calculated on a dry weight basis) of tobacco extract. In some cases, the amorphous solid may comprise from about 5 wt %, 10 wt %, 15 wt %, 20 wt % or 25 wt % to about 55 wt %, 50 wt %, 45 wt % or 40 wt % (calculated on a dry weight basis) tobacco extract. For example, the amorphous solid may comprise 5-60 wt %, 10-55 wt % or 25-55 wt % of tobacco extract. The tobacco extract may contain nicotine at a concentration such that the amorphous solid comprises 1 wt % 1.5 wt %, 2 wt % or 2.5 wt % to about 6 wt %, 5 wt %, 4.5 wt % or 4 wt % (calculated on a dry weight basis) of nicotine. In some cases, there may be no nicotine in the amorphous solid other than that which results from the tobacco extract.

In some embodiments the amorphous solid comprises no tobacco material but does comprise nicotine. In some such cases, the amorphous solid may comprise from about 1 wt %, 2 wt %, 3 wt % or 4 wt % to about 20 wt %, 15 wt %, 10 wt % or 5 wt % (calculated on a dry weight basis) of nicotine. For example, the amorphous solid may comprise 1-20 wt % or 2-5 wt % of nicotine.

In some cases, the amorphous solid may comprise a flavor. Suitably, the amorphous solid may comprise up to about 60 wt %, 50 wt %, 40 wt %, 30 wt %, 20 wt %, 10 wt % or 5 wt % of a flavor. In some cases, the amorphous solid may comprise at least about 0.5 wt %, 1 wt %, 2 wt %, 5 wt % 10 wt %, 20 wt % or 30 wt % of a flavor (all calculated on a dry weight basis). For example, the amorphous solid may comprise 0.1-60 wt %, 1-60 wt %, 5-60 wt %, 10-60 wt %, 20-50 wt % or 30-40 wt % of a flavor. In some cases, the flavor (if present) comprises, consists essentially of or consists of menthol. In some cases, the amorphous solid does not comprise a flavor.

In some cases, the total content of active substance and flavor may be at least about 0.1 wt %, 1 wt %, 5 wt %, 10 wt %, 20 wt %, 25 wt % or 30 wt %. In some cases, the total content of active substance and flavor may be less than about 80 wt %, 70 wt %, 60 wt %, 50 wt % or 40 wt % (all calculated on a dry weight basis).

In some embodiments, the amorphous solid is a hydrogel and comprises less than about 20 wt % of water calculated on a wet weight basis. In some cases, the hydrogel may comprise less than about 15 wt %, 12 wt % or 10 wt % of water calculated on a wet weight basis (WWB). In some cases, the hydrogel may comprise at least about 1 wt %, 2 wt % or at least about 5 wt % of water (WWB). The amorphous solid comprises from about 1 wt % to about 15 wt % water, or from about 5 wt % to about 15 wt % calculated on a wet weight basis. Suitably, the water content of the amorphous solid may be from about 5 wt %, 7 wt % or 9 wt % to about 15 wt %, 13 wt % or 11 wt % (WWB), most suitably about 10 wt %.

The amorphous solid may be made from a gel, and this gel may additionally comprise a solvent, included at 0.1-50 wt %. However, the inventors have established that the inclusion of a solvent in which the flavor is soluble may reduce the gel stability and the flavor may crystallise out of the gel. As such, in some cases, the gel does not include a solvent in which the flavor is soluble.

In some embodiments, the amorphous solid comprises less than 60 wt % of a filler, such as from 1 wt % to 60 wt %, or 5 wt % to 50 wt %, or 5 wt % to 30 wt %, or 10 wt % to 20 wt %.

In other embodiments, the amorphous solid comprises less than 20 wt %, suitably less than 10 wt % or less than 5 wt % of a filler. In some cases, the amorphous solid comprises less than 1 wt % of a filler, and in some cases, comprises no filler.

The filler, if present, may comprise one or more inorganic filler materials, such as calcium carbonate, perlite, vermiculite, diatomaceous earth, colloidal silica, magnesium oxide, magnesium sulphate, magnesium carbonate, and suitable inorganic sorbents, such as molecular sieves. The filler may comprise one or more organic filler materials such as wood pulp, cellulose and cellulose derivatives. In some cases, the amorphous solid comprises less than 1 wt % of a filler, and in some cases, comprises no filler. In particular, in some cases, the amorphous solid comprises no calcium carbonate such as chalk.

In particular embodiments which include filler, the filler is fibrous. For example, the filler may be a fibrous organic filler material such as wood pulp, hemp fibre, cellulose or cellulose derivatives. Without wishing to be bound by theory, it is believed that including fibrous filler in an amorphous solid may increase the tensile strength of the material. This may be particularly advantageous in examples wherein the amorphous solid is provided as a sheet, such as when an amorphous solid sheet circumscribes a rod of aerosolizable material.

In some embodiments, the amorphous solid does not comprise tobacco fibres. In particular embodiments, the amorphous solid does not comprise fibrous material.

In some embodiments, the aerosol generating material does not comprise tobacco fibres. In particular embodiments, the aerosol generating material does not comprise fibrous material.

In some embodiments, the aerosol generating substrate does not comprise tobacco fibres. In particular embodiments, the aerosol generating substrate does not comprise fibrous material.

In some embodiments, the aerosol generating article does not comprise tobacco fibres. In particular embodiments, the aerosol generating article does not comprise fibrous material.

In some cases, the amorphous solid may consist essentially of, or consist of a gelling agent, an aerosol generating agent, an active substance (such as tobacco material or a nicotine source), water, and optionally a flavor.

Aerosol Generating Article and Assembly

A second aspect of the disclosure provides an aerosol generating assembly comprising a laminate aerosol generating material according to the first aspect of the disclosure and a heater configured to heat but not burn the laminate aerosol generating material.

In some cases, the heater may heat, without burning, the aerosolizable material to between 120° C. and 350° C. in use. In some cases, the heater may heat, without burning, the aerosolizable material to between 140° C. and 250° C. in use. In some cases in use, substantially all of the amorphous solid is less than about 4 mm, 3 mm, 2 mm or 1 mm from the heater. In some cases, the solid is disposed between about 0.010 mm and 2.0 mm from the heater, suitably between about 0.02 mm and 1.0 mm, suitably 0.1 mm to 0.5 mm. These minimum distances may, in some cases, reflect the thickness of a carrier that supports the amorphous solid. In some cases, a surface of the amorphous solid may directly abut the heater.

In some cases, the laminate aerosol generating material may be provided as a rod in the form of a shredded sheet. In some other cases, the laminate aerosol generating material may be included in sheet form. For example, the laminate material may be included as a as a planar sheet, as a bunched or gathered sheet, as a crimped sheet, or as a rolled sheet (e.g., in the form of a tube). In some such cases, the laminate aerosol generating material may be included in an aerosol generating article/assembly as a sheet, such as a sheet circumscribing a rod of aerosolizable material (e.g. tobacco). In yet further cases, the laminate aerosol generating material described herein may be incorporated in sheet form and in shredded form.

The heater may be configured to heat not burn the laminate aerosol generating material. The heater may be, in some cases, a thin film, electrically resistive heater. In other cases, the heater may comprise an induction heater or the like. The heater may be a combustible heat source or a chemical heat source which undergoes an exothermic reaction to product heat in use. The aerosol generating assembly may comprise a plurality of heaters. The heater(s) may be powered by a battery.

The aerosol generating assembly may additionally comprise a cooling element or a filter. The cooling element, if present, may act or function to cool gaseous or aerosol components. In some cases, it may act to cool gaseous components such that they condense to form an aerosol. It may also act to space the very hot parts of the apparatus from the user. The filter, if present, may comprise any suitable filter known in the art such as a cellulose acetate plug.

In some cases, the aerosol generating assembly may be a heat-not-burn device. That is, it may contain a solid tobacco-containing material (and no liquid aerosolizable material). In some cases, the amorphous solid may comprise the tobacco material. A heat-not-burn device is disclosed in WO 2015/062983 A2, which is incorporated by reference in its entirety.

In some cases, the aerosol generating assembly may be an electronic tobacco hybrid device. That is, it may contain a solid aerosolizable material and a liquid aerosolizable material. In some cases, the amorphous solid may comprise nicotine. In some cases, the amorphous solid may comprise a tobacco material. In some cases, the amorphous solid may comprise a tobacco material and a separate nicotine source. The separate aerosolizable materials may be heated by separate heaters, the same heater or, in one case, a downstream aerosolizable material may be heated by a hot aerosol which is generated from the upstream aerosolizable material. An electronic tobacco hybrid device is disclosed in WO 2016/135331 A1, which is incorporated by reference in its entirety.

The disclosure also provides an aerosol generating article comprising an aerosol generating material according to the first aspect of the disclosure. The article may be adapted for use in a THP, an electronic tobacco hybrid device or another aerosol generating device. In some cases, the article may additionally comprise a filter or cooling element, as described previously. In some cases, the aerosol generating article may be circumscribed by a wrapping material such as paper.

The aerosol generating article may additionally comprise ventilation apertures. These may be provided in the sidewall of the article. In some cases, the ventilation apertures may be provided in the filter or cooling element. These apertures may allow cool air to be drawn into the article during use, which can mix with the heated volatilised components thereby cooling the aerosol.

The ventilation enhances the generation of visible heated volatilised components from the article when it is heated in use. The heated volatilised components are made visible by the process of cooling the heated volatilised components such that supersaturation of the heated volatilised components occurs. The heated volatilised components then undergo droplet formation, otherwise known as nucleation, and eventually the size of the aerosol particles of the heated volatilised components increases by further condensation of the heated volatilised components and by coagulation of newly formed droplets from the heated volatilised components.

In some cases, the ratio of the cool air to the sum of the heated volatilised components and the cool air, known as the ventilation ratio, is at least 15%. A ventilation ratio of 15% enables the heated volatilised components to be made visible by the method described above. The visibility of the heated volatilised components enables the user to identify that the volatilised components have been generated and adds to the sensory experience of the smoking experience.

In another example, the ventilation ratio is between 50% and 85% to provide additional cooling to the heated volatilised components. In some cases, the ventilation ratio may be at least 60% or 65%.

Figure 2:
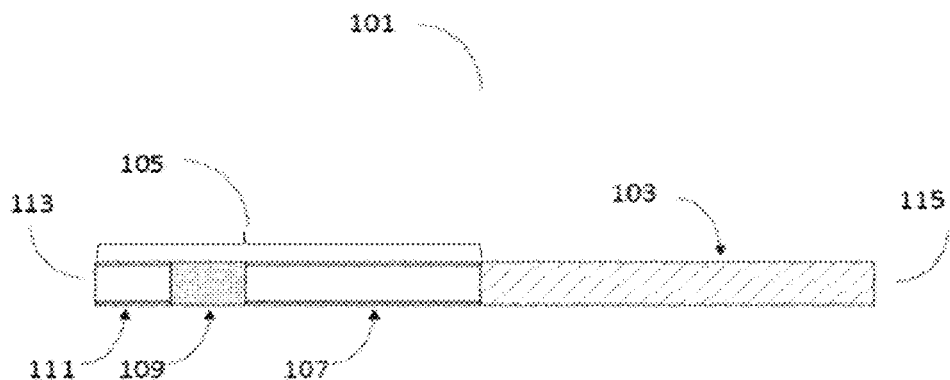
FIG. 2 shows a section view of an example of an aerosol generating article.
Figure 3:
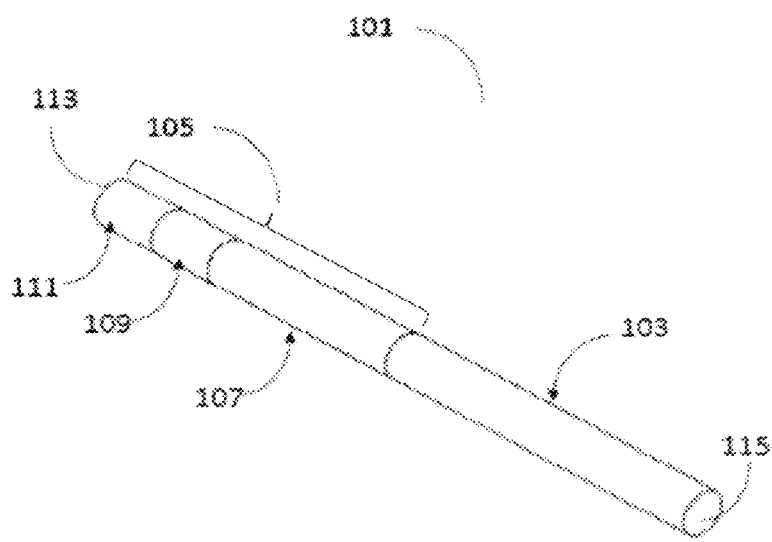
FIG. 3 shows a perspective view of the article of FIG. 2.

Referring to FIGS. 2 and 3, there are shown a partially cut-away section view and a perspective view of an example of an aerosol generating article 101. The article 101 is adapted for use with a device having a power source and a heater. The article 101 of this embodiment may be particularly suitable for use with a device 1 shown in FIGS. 6 to 8, described below. In use, the article 101 may be removably inserted into the device shown in FIG. 6 at an opening 20 of the device 1.

The article 101 of one example is in the form of a substantially cylindrical rod that includes a body of aerosol generating material 103 and a filter assembly 105 in the form of a rod. The aerosol generating material comprises the laminate aerosol generating material described herein. In the illustrated embodiment, the laminate aerosol generating material may be provided as a rod in the form of a shredded sheet. In some other embodiments (not illustrated), the laminate aerosol generating material may be included in sheet form. For example, the laminate material may be included as a as a planar sheet, as a bunched or gathered sheet, as a crimped sheet, or as a rolled sheet (e.g., in the form of a tube). In some such cases, the laminate aerosol generating material may be included in an aerosol generating article/assembly as a sheet, such as a sheet circumscribing a rod of aerosolizable material (e.g. tobacco). In yet further embodiments (also not illustrated), the laminate aerosol generating material described herein may be incorporated in sheet form and in shredded form.

The filter assembly 105 includes three segments, a cooling segment 107, a filter segment 109 and a mouth end segment 111. The article 101 has a first end 113, also known as a mouth end or a proximal end and a second end 115, also known as a distal end. The body of aerosol generating material 103 is located towards the distal end 115 of the article 101. In one example, the cooling segment 107 is located adjacent the body of aerosol generating material 103 between the body of aerosol generating material 103 and the filter segment 109, such that the cooling segment 107 is in an abutting relationship with the aerosol generating material 103 and the filter segment 109. In other examples, there may be a separation between the body of aerosol generating material 103 and the cooling segment 107 and between the body of aerosol generating material 103 and the filter segment 109. The filter segment 109 is located in between the cooling segment 107 and the mouth end segment 111. The mouth end segment 111 is located towards the proximal end 113 of the article 101, adjacent the filter segment 109. In one example, the filter segment 109 is in an abutting relationship with the mouth end segment 111. In one embodiment, the total length of the filter assembly 105 is between 37 mm and 45 mm, more preferably, the total length of the filter assembly 105 is 41 mm.

In one example, the rod of aerosol generating material 103 is between 34 mm and 50 mm in length, suitably between 38 mm and 46 mm in length, suitably 42 mm in length.

In one example, the total length of the article 101 is between 71 mm and 95 mm, suitably between 79 mm and 87 mm, suitably 83 mm.

An axial end of the body of aerosol generating material 103 is visible at the distal end 115 of the article 101. However, in other embodiments, the distal end 115 of the article 101 may comprise an end member (not shown) covering the axial end of the body of aerosol generating material 103.

The body of aerosol generating material 103 is joined to the filter assembly 105 by annular tipping paper (not shown), which is located substantially around the circumference of the filter assembly 105 to surround the filter assembly 105 and extends partially along the length of the body of aerosol generating material 103. In one example, the tipping paper is made of 58GSM standard tipping base paper. In one example the tipping paper has a length of between 42 mm and 50 mm, suitably of 46 mm.

In one example, the cooling segment 107 may be an annular tube and is located around and defines an air gap within the cooling segment. The air gap provides a chamber for heated volatilised components generated from the body of aerosol generating material 103 to flow. The cooling segment 107 is hollow to provide a chamber for aerosol accumulation yet rigid enough to withstand axial compressive forces and bending moments that might arise during manufacture and whilst the article 101 is in use during insertion into the device 1. In one example, the thickness of the wall of the cooling segment 107 is approximately 0.29 mm.

The cooling segment 107 provides a physical displacement between the aerosol generating material 103 and the filter segment 109. The physical displacement provided by the cooling segment 107 will provide a thermal gradient across the length of the cooling segment 107. In one example the cooling segment 107 is configured to provide a temperature differential of at least 40 degrees Celsius between a heated volatilised component entering a first end of the cooling segment 107 and a heated volatilised component exiting a second end of the cooling segment 107. In one example the cooling segment 107 may be configured to provide a temperature differential of at least 60 degrees Celsius between a heated volatilised component entering a first end of the cooling segment 107 and a heated volatilised component exiting a second end of the cooling segment 107. This temperature differential across the length of the cooling element 107 protects the temperature sensitive filter segment 109 from the high temperatures of the aerosol generating material 103 when it is heated by the device 1. If the physical displacement was not provided between the filter segment 109 and the body of aerosol generating material 103 and the heating elements of the device 1, then the temperature sensitive filter segment may 109 become damaged in use, so it would not perform its required functions as effectively.

In one example the length of the cooling segment 107 is at least 15 mm. In one example, the length of the cooling segment 107 is between 20 mm and 30 mm, more particularly 23 mm to 27 mm, more particularly 25 mm to 27 mm, suitably 25 mm.

The cooling segment 107 may be made of paper, which means that it is comprised of a material that does not generate compounds of concern, for example, toxic compounds when in use adjacent to the heater of the device 1. In one example, the cooling segment 107 may be manufactured from a spirally wound paper tube which provides a hollow internal chamber yet maintains mechanical rigidity. Spirally wound paper tubes are able to meet the tight dimensional accuracy requirements of high-speed manufacturing processes with respect to tube length, outer diameter, roundness and straightness.

In another example, the cooling segment 107 is a recess created from stiff plug wrap or tipping paper. The stiff plug wrap or tipping paper may be manufactured to have a rigidity that is sufficient to withstand the axial compressive forces and bending moments that might arise during manufacture and whilst the article 101 is in use during insertion into the device 1.

The filter segment 109 may be formed of any filter material sufficient to remove one or more volatilised compounds from heated volatilised components from the aerosol generating material. In one example the filter segment 109 may be made of a mono-acetate material, such as cellulose acetate. The filter segment 109 provides cooling and irritation-reduction from the heated volatilised components without depleting the quantity of the heated volatilised components to an unsatisfactory level for a user.

In some embodiments, a capsule (not illustrated) may be provided in filter segment 109. It may be disposed substantially centrally in the filter segment 109, both across the filter segment 109 diameter and along the filter segment 109 length. In other cases, it may be offset in one or more dimension. The capsule may in some cases, where present, contain a volatile component such as a flavorant or aerosol generating agent.

The density of the cellulose acetate tow material of the filter segment 109 controls the pressure drop across the filter segment 109, which in turn controls the draw resistance of the article 101. Therefore the selection of the material of the filter segment 109 may be important in controlling the resistance to draw of the article 101. In addition, the filter segment performs a filtration function in the article 101.

In one example, the filter segment 109 may be made of a 8Y15 grade of filter tow material, which provides a filtration effect on the heated volatilised material, whilst also reducing the size of condensed aerosol droplets which result from the heated volatilised material.

The presence of the filter segment 109 provides an insulating effect by providing further cooling to the heated volatilised components that exit the cooling segment 107. This further cooling effect reduces the contact temperature of the user's lips on the surface of the filter segment 109.

In one example, the filter segment 109 is between 6 mm to 10 mm in length, suitably 8 mm.

The mouth end segment 111 is an annular tube and is located around and defines an air gap within the mouth end segment 111. The air gap provides a chamber for heated volatilised components that flow from the filter segment 109. The mouth end segment 111 is hollow to provide a chamber for aerosol accumulation yet rigid enough to withstand axial compressive forces and bending moments that might arise during manufacture and whilst the article is in use during insertion into the device 1. In one example, the thickness of the wall of the mouth end segment 111 is approximately 0.29 mm. In one example, the length of the mouth end segment 111 is between 6 mm to 10 mm, suitably 8 mm.

The mouth end segment 111 may be manufactured from a spirally wound paper tube which provides a hollow internal chamber yet maintains critical mechanical rigidity. Spirally wound paper tubes are able to meet the tight dimensional accuracy requirements of high-speed manufacturing processes with respect to tube length, outer diameter, roundness and straightness.

The mouth end segment 111 provides the function of preventing any liquid condensate that accumulates at the exit of the filter segment 109 from coming into direct contact with a user.

It should be appreciated that, in one example, the mouth end segment 111 and the cooling segment 107 may be formed of a single tube and the filter segment 109 is located within that tube separating the mouth end segment 111 and the cooling segment 107.

Figure 4:
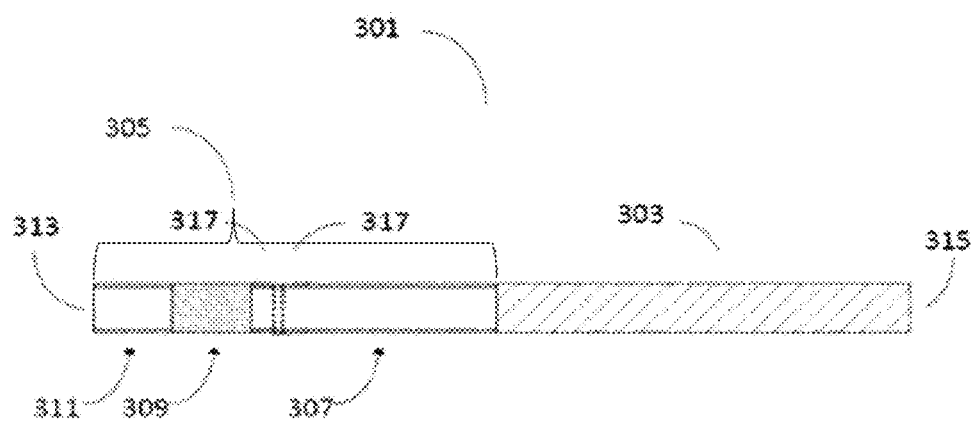
FIG. 4 shows a sectional elevation of an example of an aerosol generating article.
Figure 5:
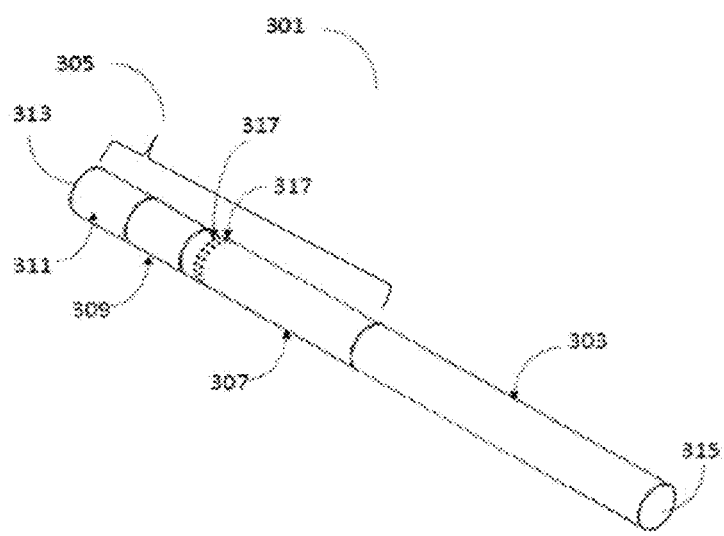
FIG. 5 shows a perspective view of the article of FIG. 4.

Referring to FIGS. 4 and 5, there are shown a partially cut-away section and perspective views of an example of an article 301. The reference signs shown in FIGS. 4 and 5 are equivalent to the reference signs shown in FIGS. 2 and 3, but with an increment of 200. In other words, the filter assembly 305 includes three segments, a cooling segment 307, a filter segment 309 and a mouth end segment 311.

In the example of the article 301 shown in FIGS. 4 and 5, a ventilation region 317 is provided in the article 301 to enable air to flow into the interior of the article 301 from the exterior of the article 301. In one example the ventilation region 317 takes the form of one or more ventilation holes 317 formed through the outer layer of the article 301. The ventilation holes may be located in the cooling segment 307 to aid with the cooling of the article 301. In one example, the ventilation region 317 comprises one or more rows of holes, and preferably, each row of holes is arranged circumferentially around the article 301 in a cross-section that is substantially perpendicular to a longitudinal axis of the article 301.

In one example, there are between one to four rows of ventilation holes to provide ventilation for the article 301. Each row of ventilation holes may have between 12 to 36 ventilation holes 317. The ventilation holes 317 may, for example, be between 100 to 500 μm in diameter. In one example, an axial separation between rows of ventilation holes 317 is between 0.25 mm and 0.75 mm, suitably 0.5 mm.

In one example, the ventilation holes 317 are of uniform size. In another example, the ventilation holes 317 vary in size. The ventilation holes can be made using any suitable technique, for example, one or more of the following techniques: laser technology, mechanical perforation of the cooling segment 307 or pre-perforation of the cooling segment 307 before it is formed into the article 301. The ventilation holes 317 are positioned so as to provide effective cooling to the article 301.

In one example, the rows of ventilation holes 317 are located at least 11 mm from the proximal end 313 of the article, suitably between 17 mm and 20 mm from the proximal end 313 of the article 301. The location of the ventilation holes 317 may be positioned such that user does not block the ventilation holes 317 when the article 301 is in use.

Figure 7:
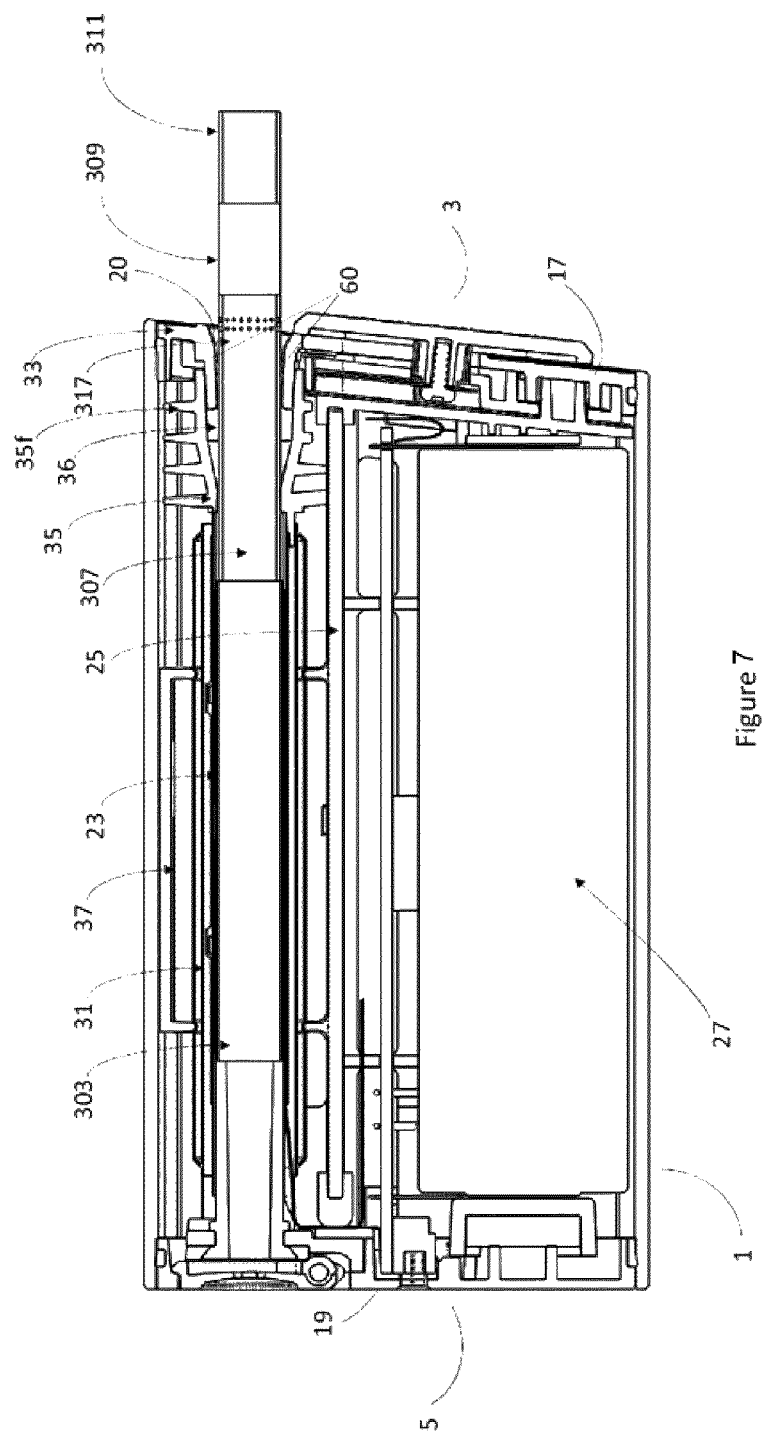
FIG. 7 shows a section view of an example of an aerosol generating assembly.
Figure 8:
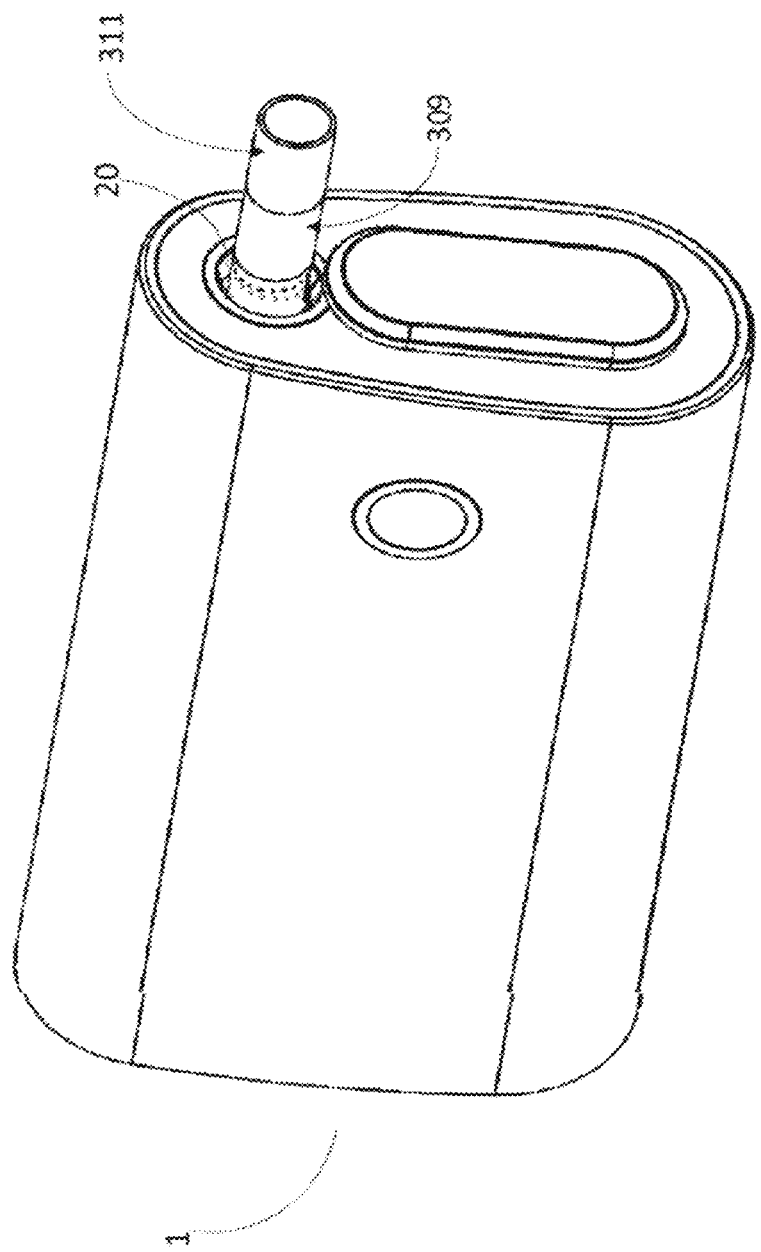
FIG. 8 shows a perspective view of an example of an aerosol generating assembly.

Providing the rows of ventilation holes between 17 mm and 20 mm from the proximal end 313 of the article 301 enables the ventilation holes 317 to be located outside of the device 1, when the article 301 is fully inserted in the device 1, as can be seen in FIGS. 7 and 8. By locating the ventilation holes outside of the device, non-heated air is able to enter the article 301 through the ventilation holes from outside the device 1 to aid with the cooling of the article 301.

The length of the cooling segment 307 is such that the cooling segment 307 will be partially inserted into the device 1, when the article 301 is fully inserted into the device 1. The length of the cooling segment 307 provides a first function of providing a physical gap between the heater arrangement of the device 1 and the heat sensitive filter arrangement 309, and a second function of enabling the ventilation holes 317 to be located in the cooling segment, whilst also being located outside of the device 1, when the article 301 is fully inserted into the device 1. As can be seen from FIGS. 7 and 8, the majority of the cooling element 307 is located within the device 1. However, there is a portion of the cooling element 307 that extends out of the device 1. It is in this portion of the cooling element 307 that extends out of the device 1 in which the ventilation holes 317 are located.

Figure 6:
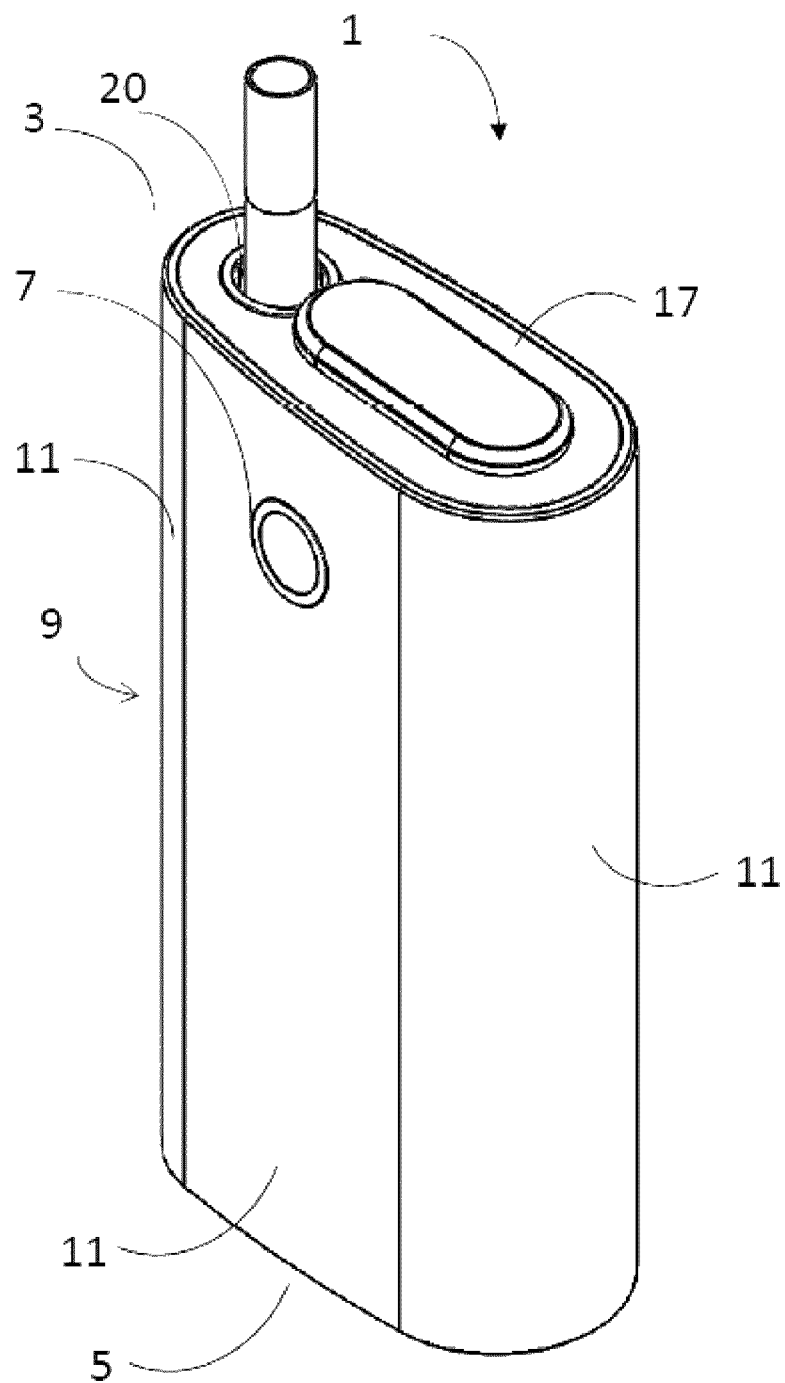
FIG. 6 shows a perspective view of an example of an aerosol generating assembly.

Referring now to FIGS. 6 to 8 in more detail, there is shown an example of a device 1 arranged to heat aerosol generating material to volatilise at least one component of said aerosol generating material, typically to form an aerosol which can be inhaled. The device 1 is a heating device which releases compounds by heating, but not burning, the aerosol generating material.

A first end 3 is sometimes referred to herein as the mouth or proximal end 3 of the device 1 and a second end 5 is sometimes referred to herein as the distal end 5 of the device 1. The device 1 has an on/off button 7 to allow the device 1 as a whole to be switched on and off as desired by a user.

The device 1 comprises a housing 9 for locating and protecting various internal components of the device 1. In the example shown, the housing 9 comprises a uni-body sleeve 11 that encompasses the perimeter of the device 1, capped with a top panel 17 which defines generally the 'top' of the device 1 and a bottom panel 19 which defines generally the 'bottom' of the device 1. In another example the housing comprises a front panel, a rear panel and a pair of opposite side panels in addition to the top panel 17 and the bottom panel 19.

The top panel 17 or the bottom panel 19 may be removably fixed to the uni-body sleeve 11, to permit easy access to the interior of the device 1, or may be "permanently" fixed to the uni-body sleeve 11, for example to deter a user from accessing the interior of the device 1. In an example, the panels 17 and 19 are made of a plastics material, including for example glass-filled nylon formed by injection moulding, and the uni-body sleeve 11 may be made of aluminium, though other materials and other manufacturing processes may be used.

The top panel 17 of the device 1 has an opening 20 at the mouth end 3 of the device 1 through which, in use, the article 101, 301 including the aerosol generating material may be inserted into the device 1 and removed from the device 1 by a user.

The housing 9 has located or fixed therein a heater arrangement 23, control circuitry 25 and a power source 27. In this example, the heater arrangement 23, the control circuitry 25 and the power source 27 are laterally adjacent (that is, adjacent when viewed from an end), with the control circuitry 25 being located generally between the heater arrangement 23 and the power source 27, though other locations are possible.

The control circuitry 25 may include a controller, such as a microprocessor arrangement, configured and arranged to control the heating of the aerosol generating material in the article 101, 301 as discussed further below.

The power source 27 may be for example a battery, which may be a rechargeable battery or a non-rechargeable battery. Examples of suitable batteries include for example a lithium-ion battery, a nickel battery (such as a nickel-cadmium battery), an alkaline battery or the like. The battery 27 is electrically coupled to the heater arrangement 23 to supply electrical power when required and under control of the control circuitry 25 to heat the aerosol generating material in the article (as discussed, to volatilise the aerosol generating material without causing the aerosol generating material to burn).

An advantage of locating the power source 27 laterally adjacent to the heater arrangement 23 is that a physically large power source 27 may be used without causing the device 1 as a whole to be unduly lengthy. As will be understood, in general a physically large power source 27 has a higher capacity (that is, the total electrical energy that can be supplied, often measured in Amp-hours or the like) and thus the battery life for the device 1 can be longer.

In one example, the heater arrangement 23 is generally in the form of a hollow cylindrical tube, having a hollow interior heating chamber into which the article 101, 301 comprising the aerosol generating material is inserted for heating in use. Different arrangements for the heater arrangement 23 are possible. For example, the heater arrangement 23 may comprise a single heating element or may be formed of plural heating elements aligned along the longitudinal axis of the heater arrangement 23. The or each heating element may be annular or tubular, or at least part-annular or part-tubular around its circumference. In an example, the or each heating element may be a thin film heater. In another example, the or each heating element may be made of a ceramics material. Examples of suitable ceramics materials include alumina and aluminium nitride and silicon nitride ceramics, which may be laminated and sintered. Other heating arrangements are possible, including for example inductive heating, infrared heater elements, which heat by emitting infrared radiation, or resistive heating elements formed by for example a resistive electrical winding.

In one particular example, the heater arrangement 23 may be supported by a stainless steel support tube and comprises a polyimide heating element. The heater arrangement 23 is dimensioned so that substantially the whole of the body of aerosol generating material 103, 303 of the article 101, 301 is inserted into the heater arrangement 23 when the article 101, 301 is inserted into the device 1.

The or each heating element may be arranged so that selected zones of the aerosol generating material can be independently heated, for example in turn (over time, as discussed above) or together (simultaneously) as desired.

The heater arrangement 23 in this example is surrounded along at least part of its length by a thermal insulator 31. The insulator 31 helps to reduce heat passing from the heater arrangement 23 to the exterior of the device 1. This helps to keep down the power requirements for the heater arrangement 23 as it reduces heat losses generally. The insulator 31 also helps to keep the exterior of the device 1 cool during operation of the heater arrangement 23. In one example, the insulator 31 may be a double-walled sleeve which provides a low pressure region between the two walls of the sleeve. That is, the insulator 31 may be for example a "vacuum" tube, e.g., a tube that has been at least partially evacuated so as to minimise heat transfer by conduction or convection. Other arrangements for the insulator 31 are possible, including using heat insulating materials, including for example a suitable foam-type material, in addition to or instead of a double-walled sleeve.

The housing 9 may further comprises various internal support structures 37 for supporting all internal components, as well as the heating arrangement 23.

The device 1 further comprises a collar 33 which extends around and projects from the opening 20 into the interior of the housing 9 and a chamber 35 that is generally tubular and hollow, which is located between the collar 33 and one end of the vacuum sleeve 31. The chamber 35 further comprises a cooling structure 35f, which in this example, comprises a plurality of cooling fins 35f spaced apart along the outer surface of the chamber 35, and each arranged circumferentially around outer surface of the chamber 35. There is an air gap 36 between the chamber 35 and the article 101, 301 when it is inserted in the device 1 over at least part of the length of the chamber 35. The air gap 36 is around all of the circumference of the article 101, 301 over at least part of the cooling segment 307.

The collar 33 comprises a plurality of ridges 60 arranged circumferentially around the periphery of the opening 20 and which project into the opening 20. The ridges 60 take up space within the opening 20 such that the open span of the opening 20 at the locations of the ridges 60 is less than the open span of the opening 20 at the locations without the ridges 60. The ridges 60 are configured to engage with an article 101, 301 inserted into the device to assist in securing it within the device 1. Open spaces (not shown in the Figures) defined by adjacent pairs of ridges 60 and the article 101, 301 form ventilation paths around the exterior of the article 101, 301. These ventilation paths allow hot vapors that have escaped from the article 101, 301 to exit the device 1 and allow cooling air to flow into the device 1 around the article 101, 301 in the air gap 36.

In operation, the article 101, 301 is removably inserted into an opening 20 of the device 1, as shown in FIGS. 6 to 8. Referring particularly to FIG. 7, in one example, the body of aerosol generating material 103, 303, which is located towards the distal end 115, 315 of the article 101, 301, may be entirely received within the heater arrangement 23 of the device 1. The proximal end 113, 313 of the article 101, 301 extends from the device 1 and acts as a mouthpiece assembly for a user.

In operation, the heater arrangement 23 will heat the article 101, 301 to volatilise at least one component of the aerosol generating material from the body of aerosol generating material 103, 303.

The primary flow path for the heated volatilised components from the body of aerosol generating material 103, 303 is axially through the article 101, 301, through the chamber inside the cooling segment 107, 307, through the filter segment 109, 309, through the mouth end segment 111, 311 to the user. In one example, the temperature of the heated volatilised components that are generated from the body of aerosol generating material is between 60° C. and 250° C., which may be above the acceptable inhalation temperature for a user. As the heated volatilised component travels through the cooling segment 107, 307, it will cool and some volatilised components will condense on the inner surface of the cooling segment 107, 307.

In the examples of the article 301 shown in FIGS. 4 and 5, cool air will be able to enter the cooling segment 307 via the ventilation holes 317 formed in the cooling segment 307. This cool air will mix with the heated volatilised components to provide additional cooling to the heated volatilised components.

Method of Manufacture

A fourth aspect of the disclosure provides a method of making laminate aerosol generating material according to the first aspect.

The method may comprise (a) forming a slurry comprising components of the amorphous solid or precursors thereof, (b) applying the slurry to the carrier, (c) setting the slurry to form a gel, and (d) drying to form an amorphous solid.

The step (b) of forming a layer of the slurry may comprise spraying, casting or extruding the slurry, for example. In some cases, the layer is formed by electrospraying the slurry. In some cases, the layer is formed by casting the slurry.

In some cases, the steps (b), (c), or (d) may, at least partially, occur simultaneously (for example, during electrospraying). In some cases, these steps may occur sequentially.

In some examples, the slurry has a viscosity of from about 10 to about 20 Pa·s at 46.5° C., such as from about 14 to about 16 Pa·s at 46.5° C.

The step (c) of setting the gel may comprise the addition of a setting agent to the slurry. For example, the slurry may comprise sodium, potassium or ammonium alginate as a gel-precursor, and a setting agent comprising a calcium source (such as calcium chloride), may be added to the slurry to form a calcium alginate gel.

The total amount of the setting agent, such as a calcium source, may be 0.5-5 wt % (calculated on a dry weight basis). The inventors have found that the addition of too little setting agent may result in a gel which does not stabilize the gel components and results in these components dropping out of the gel. The inventors have found that the addition of too much setting agent results in a gel that is very tacky and consequently has poor handleability.

Alginate salts are derivatives of alginic acid and are typically high molecular weight polymers (10-600 kDa). Alginic acid is a copolymer of β-D-mannuronic (M) and α-L-guluronic acid (G) units (blocks) linked together with (1,4)-glycosidic bonds to form a polysaccharide. On addition of calcium cations, the alginate crosslinks to form a gel. The inventors have determined that alginate salts with a high G monomer content more readily form a gel on addition of the calcium source. In some cases therefore, the gel-precursor may comprise an alginate salt in which at least about 40%, 45%, 50%, 55%, 60% or 70% of the monomer units in the alginate copolymer are α-L-guluronic acid (G) units.

The method of the third aspect may further comprises a step of shredding the laminate aerosol forming material to form a shredded laminate aerosol generating material according to some embodiments of the first aspect.

The slurry itself may also form part of the disclosure. In some cases, the slurry solvent may consist essentially of or consist of water. In some cases, the slurry may comprise from about 50 wt %, 60 wt %, 70 wt %, 80 wt % or 90 wt % of solvent (WWB).

In cases where the solvent consists of water, the dry weight content of the slurry may match the dry weight content of the amorphous solid. Thus, the discussion herein relating to the solid composition is explicitly disclosed in combination with the slurry aspect of the disclosure.

Exemplary Embodiments

In some embodiments, the amorphous solid comprises menthol.

Particular embodiments comprising a menthol-containing amorphous solid may be particularly suitable for including in an aerosol generating article/assembly as a shredded sheet. In these embodiments, the amorphous solid may have the following composition (DWB): gelling agent (preferably comprising alginate, more preferably comprising a combination of alginate and pectin) in an amount of from about 20 wt % to about 40 wt %, or about 25 wt % to 35 wt %; menthol in an amount of from about 35 wt % to about 60 wt %, or from about 40 wt % to 55 wt %; aerosol generating agent (preferably comprising glycerol) in an amount of from about 10 wt % to about 30 wt %, or from about 15 wt % to about 25 wt % (DWB).

In one embodiment, the amorphous solid comprises about 32-33 wt % of an alginate/pectin gelling agent blend; about 47-48 wt % menthol flavorant; and about 19-20 wt % glycerol aerosol generating agent (DWB).

The amorphous solid of these embodiments may have any suitable water content. For example, the amorphous solid may have a water content of from about 2 wt % to about 10 wt %, or from about 5 wt % to about 8 wt %, or about 6 wt %.

As noted above, the amorphous solid of these embodiments may be included in an aerosol generating article/assembly as a shredded sheet. The shredded sheet may be provided in the article/assembly blended with cut tobacco. Alternatively, the amorphous solid may be provided as a non-shredded sheet. Suitably, the shredded or non-shredded sheet has a thickness of from about 0.015 mm to about 1 mm, preferably from about 0.02 mm to about 0.07 mm.

Particular embodiments of the menthol-containing amorphous solid may be particularly suitable for including in an aerosol generating article/assembly as a sheet, such as a sheet circumscribing a rod of aerosolizable material (e.g. tobacco). In these embodiments, the amorphous solid may have the following composition (DWB): gelling agent (preferably comprising alginate, more preferably comprising a combination of alginate and pectin) in an amount of from about 5 wt % to about 40 wt %, or about 10 wt % to 30 wt %; menthol in an amount of from about 10 wt % to about 50 wt %, or from about 15 wt % to 40 wt %; aerosol generating agent (preferably comprising glycerol) in an amount of from about 5 wt % to about 40 wt %, or from about 10 wt % to about 35 wt %; and optionally filler in an amount of up to 60 wt %—for example, in an amount of from 5 wt % to 20 wt %, or from about 40 wt % to 60 wt % (DWB).

In one of these embodiments, the amorphous solid comprises about 11 wt % of an alginate/pectin gelling agent blend, about 56 wt % woodpulp filler, about 18% menthol flavorant and about 15 wt % glycerol (DWB).

In another of these embodiments, the amorphous solid comprises about 22 wt % of an alginate/pectin gelling agent blend, about 12 wt % woodpulp filler, about 36% menthol flavorant and about 30 wt % glycerol (DWB).

As noted above, the amorphous solid of these embodiments may be included as a sheet. In one embodiment, the sheet may be provided on a carrier comprising paper. In one embodiment, the sheet may be provided on a carrier comprising metal foil, suitably aluminium metal foil. In this embodiment, the amorphous solid may abut the metal foil.

In one embodiment, the sheet forms part of a laminate material with a layer (preferably comprising paper) attached to a top and bottom surface of the sheet. Suitably, the sheet of amorphous solid has a thickness of from about 0.015 mm to about 1 mm.

In some embodiments, the amorphous solid comprises a flavorant which does not comprise menthol. In these embodiments, the amorphous solid may have the following composition (DWB): gelling agent (preferably comprising alginate) in an amount of from about 5 to about 40 wt %, or from about 10 wt % to about 35 wt %, or from about 20 wt % to about 35 wt %; flavorant in an amount of from about 0.1 wt % to about 40 wt %, of from about 1 wt % to about 30 wt %, or from about 1 wt % to about 20 wt %, or from about 5 wt % to about 20 wt %; aerosol generating agent (preferably comprising glycerol) in an amount of from 15 wt % to 75 wt %, or from about 30 wt % to about 70 wt %, or from about 50 wt % to about 65 wt %; and optionally filler (suitably woodpulp) in an amount of less than about 60 wt %, or about 20 wt %, or about 10 wt %, or about 5 wt % (preferably the amorphous solid does not comprise filler) (DWB).

In one of these embodiments, the amorphous solid comprises about 27 wt % alginate gelling agent, about 14 wt % flavorant and about 57 wt % glycerol aerosol generating agent (DWB).

In another of these embodiments, the amorphous solid comprises about 29 wt % alginate gelling agent, about 9 wt % flavorant and about 60 wt % glycerol (DWB).

The amorphous solid of these embodiments may be included in an aerosol generating article/assembly as a shredded sheet, optionally blended with cut tobacco. Alternatively, the amorphous solid of these embodiments may be included in an aerosol generating article/assembly as a sheet, such as a sheet circumscribing a rod of aerosolizable material (e.g. tobacco). Alternatively, the amorphous solid of these embodiments may be included in an aerosol generating article/assembly as a layer portion disposed on a carrier.

In some embodiments, the amorphous solid comprises tobacco extract. In these embodiments, the amorphous solid may have the following composition (DWB): gelling agent (preferably comprising alginate) in an amount of from about 5 wt % to about 40 wt %, or about 10 wt % to 30 wt %, or about 15 wt % to about 25 wt %; tobacco extract in an amount of from about 30 wt % to about 60 wt %, or from about 40 wt % to 55 wt %, or from about 45 wt % to about 50 wt %; aerosol generating agent (preferably comprising glycerol) in an amount of from about 10 wt % to about 50 wt %, or from about 20 wt % to about 40 wt %, or from about 25 wt % to about 35 wt % (DWB).

In one embodiment, the amorphous solid comprises about 20 wt % alginate gelling agent, about 48 wt % Virginia tobacco extract and about 32 wt % glycerol (DWB).

The amorphous solid of these embodiments may have any suitable water content. For example, the amorphous solid may have a water content of from about 5 wt % to about 15 wt %, or from about 7 wt % to about 13 wt %, or about 10 wt %.

The amorphous solid of these embodiments may be included in an aerosol generating article/assembly as a shredded sheet, optionally blended with cut tobacco. Alternatively, the amorphous solid of these embodiments may be included in an aerosol generating article/assembly as a sheet, such as a sheet circumscribing a rod of aerosolizable material (e.g. tobacco). Alternatively, the amorphous solid of these embodiments may be included in an aerosol generating article/assembly as a layer portion disposed on a carrier. Suitably, in any of these embodiments, the amorphous solid has a thickness of from about 50 μm to about 200 μm, or about 50 μm to about 100 μm, or about 60 μm to about 90 μm, suitably about 77 μm.

The slurry for forming this amorphous solid may also form part of the disclosure. In some cases, the slurry may have an elastic modulus of from about 5 to 1200 Pa (also referred to as storage modulus); in some cases, the slurry may have a viscous modulus of about 5 to 600 Pa (also referred to as loss modulus).

Definitions

The active substance as used herein may be a physiologically active material, which is a material intended to achieve or enhance a physiological response. The active substance may for example be selected from nutraceuticals, nootropics, psychoactives. The active substance may be naturally occurring or synthetically obtained. The active substance may comprise for example nicotine, caffeine, taurine, theine, vitamins such as B6 or B12 or C, melatonin, cannabinoids, or constituents, derivatives, or combinations thereof. The active substance may comprise one or more constituents, derivatives or extracts of tobacco, *cannabis* or another botanical.

In some embodiments, the active substance comprises nicotine.

In some embodiments, the active substance comprises caffeine, melatonin or vitamin B12.

As noted herein, the active substance may comprise one or more constituents, derivatives or extracts of *cannabis*, such as one or more cannabinoids or terpenes.

Cannabinoids are a class of natural or synthetic chemical compounds which act on cannabinoid receptors (e.g., CB1 and CB2) in cells that repress neurotransmitter release in the brain. Cannabinoids may be naturally occurring (phytocannabinoids) from plants such as *cannabis*, from animals (endocannabinoids), or artificially manufactured (synthetic cannabinoids). *Cannabis* species express at least 85 different phytocannabinoids, and are divided into subclasses, including cannabigerols, cannabichromenes, cannabidiols, tetrahydrocannabinols, cannabinols and cannabinodiols, and other cannabinoids. Cannabinoids found in *cannabis* include, without limitation: cannabigerol (CBG), cannabichromene (CBC), cannabidiol (CBD), tetrahydrocannabinol (THC), cannabinol (CBN), cannabinodiol (CBDL), cannabicyclol (CBL), cannabivarin (CBV), tetrahydrocannabivarin (THCV), cannabidivarin (CBDV), cannabichromevarin (CBCV), cannabigerovarin (CBGV), cannabigerol monomethyl ether (CBGM), cannabinerolic acid, cannabidiolic acid (CBDA), Cannabinol propyl variant (CBNV), cannabitriol (CBO), tetrahydrocannabmolic acid (THCA), and tetrahydrocannabivarinic acid (THCV A).

As noted herein, the active substance may comprise or be derived from one or more botanicals or constituents, derivatives or extracts thereof. As used herein, the term "botanical" includes any material derived from plants including, but not limited to, extracts, leaves, bark, fibres, stems, roots, seeds, flowers, fruits, pollen, husk, shells or the like. Alternatively, the material may comprise an active compound naturally existing in a botanical, obtained synthetically. The material may be in the form of liquid, gas, solid, powder, dust, crushed particles, granules, pellets, shreds, strips, sheets, or the like. Example botanicals are tobacco, *eucalyptus*, star anise, hemp, cocoa, *cannabis*, fennel, lemongrass, peppermint, spearmint, rooibos, chamomile, flax, ginger, *Ginkgo biloba*, hazel, hibiscus, laurel, licorice (liquorice), matcha, mate, orange skin, *papaya*, rose, sage, tea such as green tea or black tea, thyme, clove, cinnamon, coffee, aniseed (anise), basil, bay leaves, cardamom, coriander, cumin, nutmeg, oregano, paprika, rosemary, saffron, lavender, lemon peel, mint, juniper, elderflower, vanilla, wintergreen, beefsteak plant, *curcuma*, turmeric, sandalwood, cilantro, bergamot, orange blossom, myrtle, cassis, valerian, pimento, mace, damien, marjoram, olive, lemon balm, lemon basil, chive, *carvi, verbena*, tarragon, geranium, mulberry, *ginseng*, theanine, theacrine, maca, ashwagandha, damiana, guarana, chlorophyll, baobab or any combination thereof. The mint may be chosen from the following mint varieties: *Mentha arvensis, Mentha* c.v., *Mentha niliaca, Mentha piperita, Mentha piperita citrata* c.v., *Mentha piperita* c.v., *Mentha spicata crispa, Mentha cordifolia, Mentha longifolia, Mentha suaveolens variegata, Mentha pulegium, Mentha spicata* c.v. and *Mentha suaveolens*.

In some embodiments, the botanical may be selected from *eucalyptus*, star anise, cocoa and hemp.

In some embodiments, the botanical may be selected from rooibos and fennel.

As used herein, the terms "flavor" and "flavorant" refer to materials which, where local regulations permit, may be used to create a desired taste, aroma or other somatosensorial sensation in a product for adult consumers. They may include naturally occurring flavor materials, botanicals, extracts of botanicals, synthetically obtained materials, or combinations thereof (e.g., tobacco, *cannabis*, licorice (liquorice), *hydrangea*, eugenol, Japanese white bark *magnolia* leaf, chamomile, fenugreek, clove, maple, matcha, menthol, Japanese mint, aniseed (anise), cinnamon, turmeric, Indian spices, Asian spices, herb, wintergreen, cherry, berry, red berry, cranberry, peach, apple, orange, mango, clementine, lemon, lime, tropical fruit, *papaya*, rhubarb, grape, durian, dragon fruit, cucumber, blueberry, mulberry, citrus fruits, Drambuie, bourbon, scotch, whiskey, gin, tequila, rum, spearmint, peppermint, lavender, aloe vera, cardamom, celery, cascarilla, nutmeg, sandalwood, bergamot, geranium, khat, naswar, *betel*, shisha, pine, honey essence, rose oil, vanilla, lemon oil, orange oil, orange blossom, cherry blossom, *cassia*, caraway, cognac, jasmine, ylang-ylang, sage, fennel, wasabi, piment, ginger, coriander, coffee, hemp, a mint oil from any species of the genus *Mentha, eucalyptus*, star anise, cocoa, lemongrass, rooibos, flax, *Ginkgo biloba*, hazel, hibiscus, laurel, mate, orange skin, rose, tea such as green tea or black tea, thyme, juniper, elderflower, basil, bay leaves, cumin, oregano, paprika, rosemary, saffron, lemon peel, mint, beefsteak plant, *curcuma*, cilantro, myrtle, cassis, valerian, pimento, mace, damien, marjoram, olive, lemon balm, lemon basil, chive, *carvi, verbena*, tarragon, limonene, thymol, camphene), flavor enhancers, bitterness receptor site blockers, sensorial receptor site activators or stimulators, sugars or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, liquid such as an oil, solid such as a powder, or gas.

The flavor may suitably comprise one or more mint-flavors suitably a mint oil from any species of the genus *Mentha*. The flavor may suitably comprise, consist essentially of or consist of menthol.

In some embodiments, the flavor comprises menthol, spearmint or peppermint.

In some embodiments, the flavor comprises flavor components of cucumber, blueberry, citrus fruits or redberry.

In some embodiments, the flavor comprises eugenol.

In some embodiments, the flavor comprises flavor components extracted from tobacco.

In some embodiments, the flavor comprises flavor components extracted from *cannabis*.

In some embodiments, the flavor may comprise a sensate, which is intended to achieve a somatosensorial sensation which are usually chemically induced and perceived by the stimulation of the fifth cranial nerve (trigeminal nerve), in addition to or in place of aroma or taste nerves, and these may include agents providing heating, cooling, tingling, numbing effect. A suitable heat effect agent may be, but is not limited to, vanillyl ethyl ether and a suitable cooling agent may be, but not limited to eucalyptol, WS-3.

As used herein, the term "aerosol generating agent" refers to an agent that promotes the generation of an aerosol. An aerosol generating agent may promote the generation of an aerosol by promoting an initial vaporisation or the condensation of a gas to an inhalable solid or liquid aerosol.

Suitable aerosol generating agents include, but are not limited to: a polyol such as erythritol, sorbitol, glycerol, and glycols like propylene glycol or triethylene glycol; a non-polyol such as monohydric alcohols, high boiling point hydrocarbons, acids such as lactic acid, glycerol derivatives, esters such as diacetin, triacetin, triethylene glycol diacetate, triethyl citrate or myristates including ethyl myristate and isopropyl myristate and aliphatic carboxylic acid esters such as methyl stearate, dimethyl dodecanedioate and dimethyl tetradecanedioate. The aerosol generating agent may suitably have a composition that does not dissolve menthol. The aerosol generating agent may suitably comprise, consist essentially of or consist of glycerol.

As used herein, the term "tobacco material" refers to any material comprising tobacco or derivatives therefore. The term "tobacco material" may include one or more of tobacco, tobacco derivatives, expanded tobacco, reconstituted tobacco or tobacco substitutes. The tobacco material may comprise one or more of ground tobacco, tobacco fibre, cut tobacco, extruded tobacco, tobacco stem, reconstituted tobacco or tobacco extract.

The tobacco used to produce tobacco material may be any suitable tobacco, such as single grades or blends, cut rag or whole leaf, including Virginia, Burley or Oriental. It may also be tobacco particle 'fines' or dust, expanded tobacco, stems, expanded stems, and other processed stem materials, such as cut rolled stems. The tobacco material may be a ground tobacco or a reconstituted tobacco material. The reconstituted tobacco material may comprise tobacco fibres, and may be formed by casting, a Fourdrinier-based paper making-type approach with back addition of tobacco extract, or by extrusion.

All percentages by weight described herein (denoted wt %) are calculated on a dry weight basis, unless explicitly stated otherwise. All weight ratios are also calculated on a dry weight basis. A weight quoted on a dry weight basis refers to the whole of the extract or slurry or material, other than the water, and may include components which by themselves are liquid at room temperature and pressure, such as glycerol. Conversely, a weight percentage quoted on a wet weight basis refers to all components, including water.

For the avoidance of doubt, where in this specification the term "comprises" is used in describing aspects of the disclosure, embodiments are also disclosed in which the disclosure or feature can be defined using the terms "consists essentially of" or "consists of" in place of "comprises". Reference to a material "comprising" certain features means that those features are included in, contained in, or held within the material.

The above embodiments are to be understood as illustrative examples. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

The invention claimed is:

1. A laminate aerosol generating material, the material comprising an aerosol-forming amorphous solid layer attached to a carrier layer, wherein the carrier layer is attached to a first surface of the amorphous solid layer, wherein an anti-adhesive agent is applied to the amorphous solid layer of the laminate aerosol generating material and wherein the carrier layer will not adhere to any other tacky surface of the amorphous solid layer.

2. The laminate aerosol generating material according to claim 1, wherein the carrier layer comprises one or more materials selected from metal foil, paper, carbon paper, greaseproof paper, ceramic, carbon allotropes, plastic, cardboard, wood, or combinations thereof.

3. The laminate aerosol generating material according to claim 1, wherein the laminate aerosol generating material is a sheet, optionally in wound or coiled form.

4. The laminate aerosol generating material according to claim 1, wherein the material is in the form of a shredded sheet.

5. The laminate aerosol generating material according to claim 1, wherein the laminate aerosol generating material has a mass per unit area of 30-70 $g/m^2$.

6. An aerosol generating assembly comprising the laminate aerosol generating material according to claim 1, and a heater configured to heat but not burn the laminate aerosol generating material.

7. The aerosol generating assembly according to claim 6, wherein the assembly is a heat-not-burn device.

8. The aerosol generating assembly according to claim 6, wherein the assembly is an electronic tobacco hybrid device.

9. An aerosol-generating article for use in an aerosol generating assembly, the article comprising the laminate aerosol generating material according to claim 1.

10. A method of making laminate aerosol generating material comprising attaching an aerosol-forming amorphous solid layer to a carrier layer to produce the laminate aerosol generating material, wherein the carrier layer is attached to a first surface of the amorphous solid layer, wherein an anti-adhesive agent is applied to the amorphous solid layer of the laminate aerosol generating material and wherein the carrier layer will not adhere to any other tacky surface of the amorphous solid layer.

11. The method according to claim 10, the method comprising (a) forming a slurry comprising components of the amorphous solid layer or precursors thereof, (b) applying the slurry to the carrier layer, (c) setting the slurry to form a gel, and (d) drying to form an amorphous solid layer.

12. The method according to claim 11, wherein step (c) comprises the addition of a setting agent to the slurry.

13. The method according to claim 10, further comprising a step of shredding the laminate aerosol forming material.

14. A laminate aerosol generating material, the material comprising an aerosol-forming amorphous solid layer attached to a carrier layer, wherein the carrier layer is attached to a first surface of the amorphous solid layer, wherein the carrier layer will not adhere to any other surface of the amorphous solid layer, and wherein one or more surfaces of the laminate aerosol generating material are treated with an anti-adhesive agent.

15. The laminate aerosol generating material according to claim 1, a surface of the carrier layer that abuts the amorphous solid layer is porous.

* * * * *